June 1, 1954 W. LOWE 2,679,960
FISHING CREEL
Filed Oct. 21, 1950
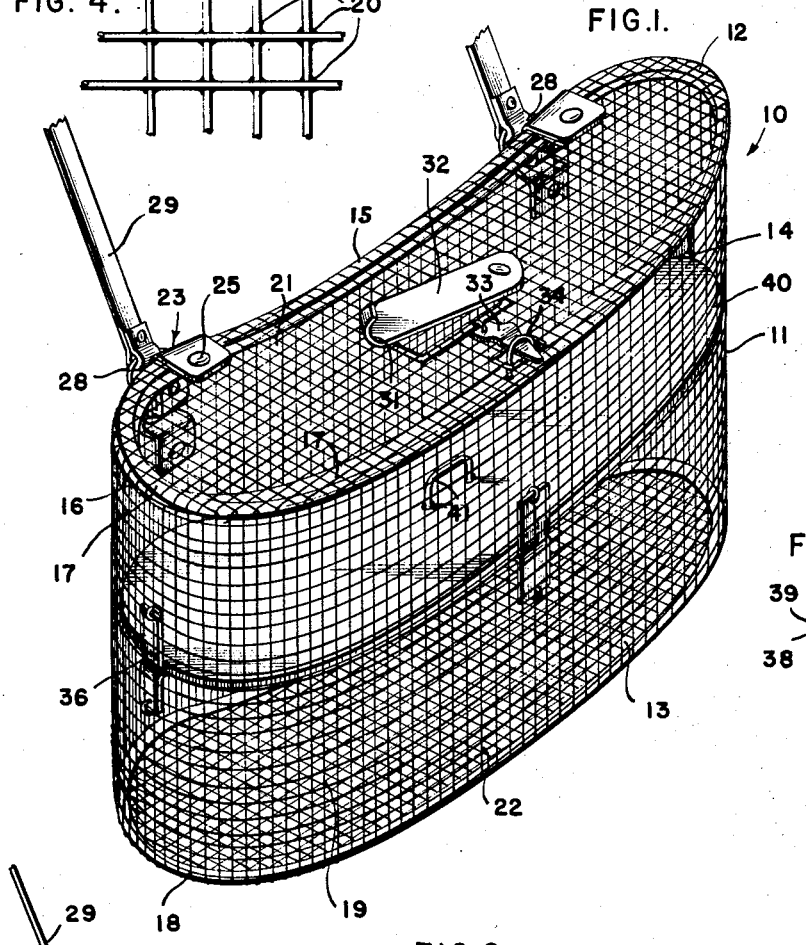
FIG. 4.
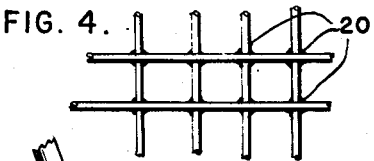
FIG. 1.
FIG. 3.
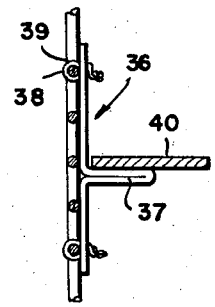
FIG. 2.
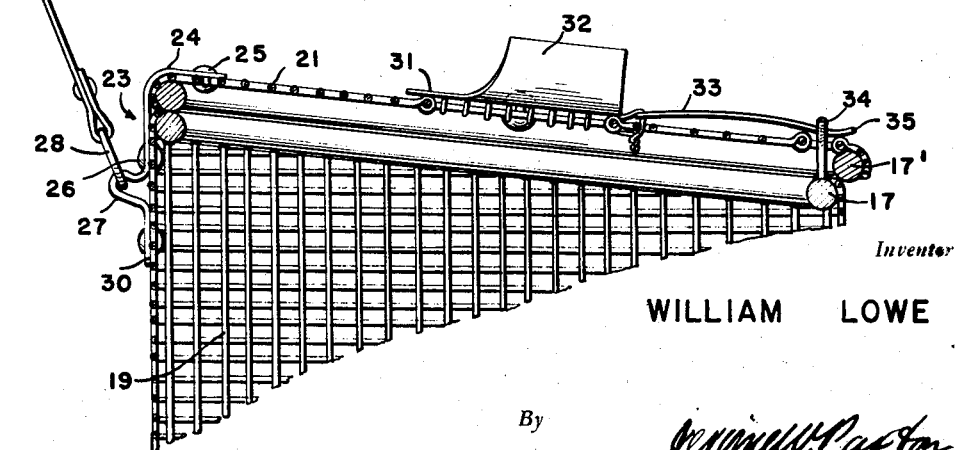
Inventor
WILLIAM LOWE Patented June 1, 1954

2,679,960

UNITED STATES PATENT OFFICE 2,679,960

FISHING CREEL

William Lowe, Payette, Idaho

Application October 21, 1950, Serial No. 191,430

1 Claim. (Cl. 224—5)

The present invention relates to a fishing creel, and more particularly has reference to a sanitary creel preferably made of wire mesh and which is designed to comfortably conform to the wearer's body.

At the present time, it is substantially uniform practice to employ fishing creels which are made of wicker or reed, suitably reinforced with leather, and while such creels are generally satisfactory, they do possess certain undesirable characteristics. After continued use, the creel becomes substantially saturated with blood and slime from the fish which, of course, is quite offensive and it is impossible to wash and deodorize the creel in a satisfactory manner. In addition, this type of creel is comparatively expensive and presents serious problems in the event the device becomes damaged.

Accordingly, a salient object of the present invention is to provide a fishing creel which is free from the foregoing and other objectionable features now present in the art.

Broadly, the invention comprises a body portion formed of wire mesh, a hinged closure or lid for the body portion, the hinge for the lid also serving as an anchorage point for the carrying strap, the body portion being curved to fit the wearer's person and particularly the side of the wearer, and a removable partition located within the body portion to prevent the weight of the later catch from bruising or otherwise injuring the earlier catch.

Inasmuch as the body portion is foraminous, the creel may be placed in the water to keep the fish alive or fresh, without injury to the creel, and, in addition, the body portion can also be used as a dip net.

An object of the present invention is to provide a fishing creel which can be relatively inexpensively manufactured and which may be easily cleaned with a minimum of effort on the part of the user.

A further object is to provide a fishing creel, the body portion and closure of which is made of metal mesh, thus providing a sturdy and long lasting device which presents few, if any, problems from the maintenance viewpoint.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in perspective of a fishing creel constructed in accordance with my inventive concept.

Figure 2 is a fragmental side view, partly in section, of the creel shown in Figure 1 but being on a somewhat enlarged scale.

Figure 3 is a detail elevational view showing the manner in which the partition is supported within the body portion, and Figure 4 is a detail view illustrating the mode of securing the individual metal strands forming the body portion and closure.

Referring to Figure 1, the creel, indicated generally 10, includes a body portion 11, a closure or lid 12, and a bottom 13. The body 11, closure 12 and the bottom 13 are convex at their front faces, as denoted generally 14, and concave at their rear faces, as at 15, the front and rear faces being joined by curved end walls 16. The rear wall is higher than the front wall to provide a downward taper and, as shown in Figures 1 and 2, the body 11 includes an upper rod-like member 17 of the desired configuration, a lower rod-like member 18, and a wire mesh fabric 19 secured to the rod-like members 17 and 18 in any desirable manner, such as by welding or the like. At the crossover points of the vertical and horizontal wires forming the mesh fabric 19, it can be seen in Figure 4 that a spot of solder or the like 20 is applied in order to insure that the individual wire strands will not be displaced with respect to each other and, in addition, to form a sturdy structure. Similar wire mesh fabrics 21 and 22 are likewise secured to the rod members 17' and 18, respectively, for forming the closure 12 and the bottom 13.

In order to hinge the closure 12 to the body 11, it will be noted that a leather strap 23 has one end 24 secured to the top 12 by means of a rivet 25, while a rivet 26 secures the strap to the rear of the wall of the body at a point below the rod member 17. The free end of the strap is provided with a bight 27 which is adapted to receive a ring or the like 28 secured to one end of a carrying strap 29, the opposite end of the strap being provided with a similar ring which is secured to the bight 27 to the opposite leather strap 23. The free end of the strap is attached to the rear wall of the body portion by means of a rivet 30. Hence, it will be appreciated that the unit for hingedly connecting the closure to the body also functions as an anchorage point for the carrying strap 29.

The closure 12 is further formed with a substantially rectangular opening 31 intermediate the ends thereof for permitting the fish to be inserted within the body portion, and a pivoted cover plate 32 is provided for closing the opening. A leather tongue 33 is secured at one end to the lower wall defining the opening 31 and is adapted to engage a U-shaped element 34 conveniently attached to the front wall of the body portion 11, the U-shaped element projecting upwardly through a slot 35 formed in the mesh fabric 21 of the closure 12. The leather tongue 33 and the U-shaped element 34 cooperate to lock the closure to the body, and this assembly provides a conveniently operated latching unit.

As hereinbefore mentioned, means are provided to divide the interior of the body portion into a pair of compartments, and to accomplish this end, it will be noted that the front, rear and end walls of the body support a bracket 36 intermediate the height of the body portion. Each bracket 36 is preferably a metal strip which is bent outwardly intermediate the ends thereof to form a horizontal shelf 37, and the ends of the strip may be secured to the wire mesh fabric by looping a wire strand 38 through an opening 39 in the strip and around the horizontal wires of the fabric. The union may be further strengthened by soldering the strands 38 to the mesh fabric. A metal partition 40 having the same configuration as the body portion 11 is adapted to rest on the horizontal shelves 37 to thus divide the body portion into upper and lower compartments. To facilitate the removal of the partition from the body portion, a U-shaped finger grip 41 is suitably secured to the upper face of the partition 40.

It is believed that the operation of my invention is readily apparent from the foregoing description. It can be seen that when the initial catch is made, the partition 40 is removed from the body portion to enable the fish to be placed within the body portion upon the bottom 13, and as additional fish are caught, the weight on the earlier caught fish may be minimized to prevent bruising and the like by placing the partition within the body portion to form a supplemental base, so to speak, for the later catch. By reason of the fact that the body of the creel in its entirety is of a wire mesh fabric, the creel may be placed in the water to keep the fish fresh.

The creel may be readily and easily cleaned to remove any objectionable matter therefrom, and inasmuch as it is fabricated of wire mesh fabric, it can be used over extended periods of time with few, if any, repair or maintenance costs.

By reason of the concave rear wall, the creel may be comfortably worn by the fisherman, since it will fit the side of the wearer.

Aside from its use as a creel, the device can be effectively employed as a dip net when fishing from boats by removing the partition which, of course, is made possible by the fact that the creel in its entirety is of a wire mesh fabric. It is also possible for the fisherman to carry his lunch by placing the same on the bottom 13 below the partition 40 and, as a consequence, the morning catch can be placed within the creel above the partition and can subsequently be transferred below the partition.

The invention is not to be confined to any strict conformity with the showing in the drawing but may be changed or modified so long as such changes or modifications mark no material departure from the salient features of the invention as expressed in the appended claim.

I claim:

In a fishing creel, a body portion defined entirely of rigid metal mesh fabric, said body portion including an integral convex front wall, a concave rear wall of greater height than the front wall, convex end walls, and a separate bottom wall, a top wall of rigid metal mesh fabric, a pair of leather straps secured at one end to the rear wall and at the opposite end to the top wall to provide a pivotal connection between the top wall and the body portion, each of said straps being provided with a looped portion, a carrying strap, means at each end of said carrying strap for engaging the said looped portion for attaching the carrying strap to the body portion, a metal strap secured to the mesh fabric inside of each of said front, rear and end walls intermediate the upper and lower limits of the respective walls, a horizontal shelf extending outwardly from each strap, the shelves being in the same plane, a planar removable partition of the same dimensions as the bottom wall adapted to be supported by said shelves to divide the interior of the body portion into two spaced compartments, and complemental means on the top wall and front wall for maintaining the top wall in the closed position.

References Cited in the file of this patent

UNITED STATES PATENTS

| Number | Name | Date |
| --- | --- | --- |
| D. 41,926 | Hubbell | Nov. 14, 1911 |
| 435,108 | Truax | Aug. 26, 1890 |
| 1,356,400 | Parr | Oct. 19, 1920 |
| 1,576,688 | Thompson | Mar. 16, 1926 |
| 1,580,474 | Eckenbrecht | Apr. 13, 1926 |
| 1,652,387 | Barber | Dec. 13, 1927 |
| 1,880,461 | Moyes | Oct. 4, 1932 |
| 1,989,527 | Powers | Jan. 29, 1935 |